US008405353B2

(12) United States Patent
Greenwood

(10) Patent No.: US 8,405,353 B2
(45) Date of Patent: Mar. 26, 2013

(54) CONTROLLER

(75) Inventor: Annette Elvina Greenwood, Stoke-on-Trent (GB)

(73) Assignee: Care-Knight Limited, Stoke-on-Trent (GB)

( * ) Notice: Subject to any disclaimer, the term of this patent is extended or adjusted under 35 U.S.C. 154(b) by 623 days.

(21) Appl. No.: 12/598,029

(22) PCT Filed: Apr. 29, 2008

(86) PCT No.: PCT/GB2008/001493

§ 371 (c)(1), (2), (4) Date: Nov. 30, 2009

(87) PCT Pub. No.: WO2008/135721

PCT Pub. Date: Nov. 13, 2008

(65) Prior Publication Data

US 2010/0138987 A1 Jun. 10, 2010

(30) Foreign Application Priority Data

May 2, 2007 (GB) .................................. 0708470.0

(51) Int. Cl.

| | |
|---|---|
| ***H02J 7/00*** | (2006.01) |
| ***H02J 7/04*** | (2006.01) |
| ***H02J 7/16*** | (2006.01) |
| ***A47K 3/02*** | (2006.01) |

(52) U.S. Cl. ........ 320/132; 320/134; 320/135; 320/136; 320/152; 320/157; 4/560.1; 4/561.1; 4/562.1; 4/563.1; 4/564.1

(58) Field of Classification Search .................. 320/114, 320/132

See application file for complete search history.

(56) References Cited

U.S. PATENT DOCUMENTS

| | | | | |
|---|---|---|---|---|
| 4,944,056 | A * | 7/1990 | Schroeder et al. | 5/85.1 |
| 5,267,360 | A * | 12/1993 | Bassil et al. | 4/560.1 |
| 5,304,915 | A | 4/1994 | Sanpei et al. | |
| 2007/0216348 | A1* | 9/2007 | Shionoiri et al. | 320/107 |

FOREIGN PATENT DOCUMENTS

| | | | |
|---|---|---|---|
| DE | 29601503 | U1 | 3/1996 |
| EP | 1561445 | A | 8/2005 |
| EP | 1561445 | A1 * | 8/2005 |
| GB | 2419086 | A * | 4/2006 |

OTHER PUBLICATIONS

Jan Petzold, International Search Report for PCT/GB2008/001493, Aug. 5, 2008.

* cited by examiner

*Primary Examiner* — Edward Tso
*Assistant Examiner* — Ahmed Omar
(74) *Attorney, Agent, or Firm* — Chernoff Vilhauer McClung & Stenzel LLP

(57) ABSTRACT

A controller 10 suitable for controlling a bath lift. The controller 10 includes a rechargeable unit 12 and a first protection unit 14 which measures the voltage and current provided by the rechargeable unit 12. The first protection unit 14 prevents connection to the bath lift when the voltage of the rechargeable unit falls below a lower predetermined limit. A second protection unit 20 is also provided which measures the voltage from the rechargeable unit 12 and detects whether the voltage has fallen below an upper predetermined voltage, and if the voltage has dropped below this level downward movement of the bath lift is not permitted.

14 Claims, 2 Drawing Sheets

CONTROLLER

This is a national stage application filed under 35 USC 371 based on International Application No. PCT/GB2008/001493 filed Apr. 29, 2008, and claims priority under 35 USC 119 of United Kingdom Patent Application No. 0708470.0 filed May 2, 2007.

This invention concerns controllers, controllers for bath lifts, and also bath lift assemblies.

Bath lifts are widely used to assist people getting in and out of baths. One type includes a flexible band which can extend across the top of a bath from a roller mechanism and can be held taut allowing a person to sit thereon. The band can then be fed out of the mechanism allowing the person to be lowered into the bath. The process can be reversed to raise a person out of the bath. The lift may be arranged such that when the band is extending across the top of the bath a small amount of power is constantly applied to the mechanism to retain the band taut.

There are potential dangers in having mains powered electrical items in bathrooms, and a significant public resistance to having such arrangements has built up.

According to the present invention there is provided a controller for a bath lift which controller can be hand held by a user of the bath lift, the controller including one or more rechargeable electric cells, connection means permitting the controller to be selectively connected to a bath lift to control same, or to a recharging unit to recharge the electric cell or cells, the controller also including operating controls selectively operable to cause the bath lift to raise or lower a person, the bath lift being powered by the electric cell or cells in the controller.

The connection means may include a lead which may extend to a connector which can be selectively connected to the bath lift or to a recharging unit for the electric cell or cells.

The connector may include first control protection means which monitors the voltage of the electric cells, and when it is detected that the voltage falls below a first upper predetermined level the first control protection means prevents the bath lift from being lowered, whereby to prevent a person from becoming stuck in a bath because there is not sufficient power to lift them thereoutof.

The controller may include second control protection means which monitors the voltage of the electric cells, and when it is detected that the voltage falls below a second lower predetermined level, the second control means prevents the bath lift from being used at all, whereby to prevent the electric cells from being discharged so much that they cannot thereafter be fully recharged.

The first upper predetermined level may be between 24 and 23 V, and may be between 24 and 23.5 V. The second lower predetermined level may be between 19 and 15 V and may be between 18 and 16 V.

The controller may be configured to provide two power sources to a bath lift, a first substantially constant power source, and a second selectively controllable source. The first power source may operate the bath lift to retain a band of the bath lift taut when in the raised position. The second source may selectively raise or lower the bath lift in response to the operating controls.

The electric cell or cells may be in the form of lithium batteries.

The invention also provides a bath lift assembly, the assembly including a bath lift and a controller according to any of the preceding seven paragraphs.

The bath lift may be of the type with a flexible band which is selectively movable between a raised position with the band extending taut across the top of the bath, and a lowered position with the band loose and extending down to substantially touch the bottom of a bath when a person is sitting on the band.

The bath lift may be arranged such that when the bath lift is on and the band is in the raised position, tension is applied to the band by the bath lift to retain the band taut.

The invention still further provides a controller for an electrically operated device, the controller including one or more rechargeable electric cells, connection means permitting the controller to be selectively connected to the device or to a recharging unit to recharge the electric cell or cells, the controller also including operating controls selectively operable to cause at least two different operations of the device, the controller including first protection control means which monitors the voltage of the electric cell or cells, and when the voltage falls below a first upper predetermined level the control means prevents at least one operation of the device; the controller also including second protection control means which monitors the voltage of the electric cell or cells and when the voltage falls below a second lower predetermined level, the second control means prevents any usage of the device.

An embodiment of the present invention will now be described by way of example only and with reference to the accompanying drawings, in which:—

Figure 1:
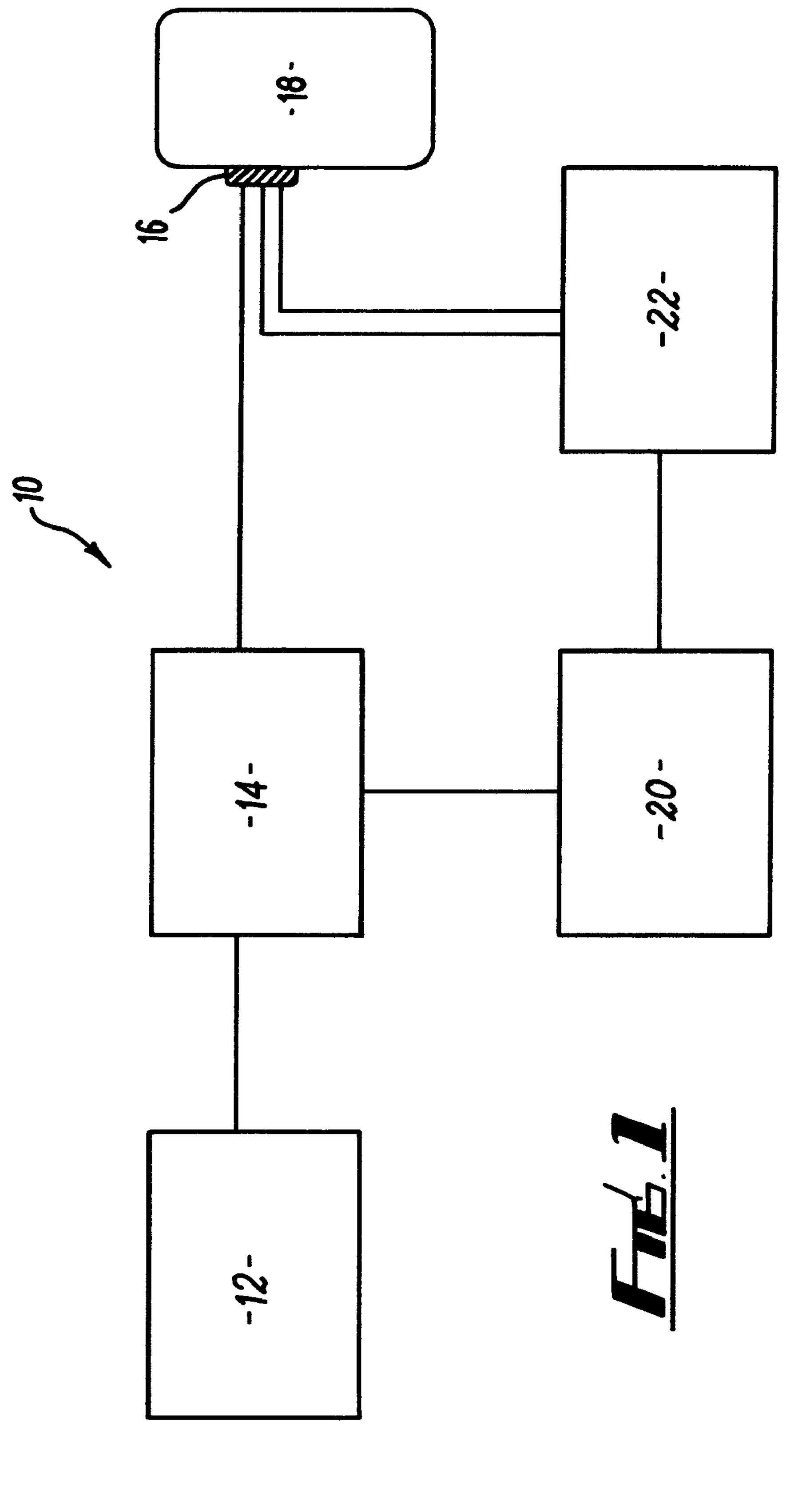
FIG. 1 is a block diagram of a controller according to the invention.

The drawings show a controller 10 suitable for controlling a bath lift of the type with a flexible band which can be retained taut across the top of a bath for a person to sit on and can be fed out of a roller mechanism to allow the person to be lowered into the bath.

The controller includes a rechargeable unit 12 in the form of seven lithium ion batteries. The rechargeable unit 12 connects to a first protection unit 14 which measures the voltage and current provided by the rechargeable unit 12. The first protection unit 14 is configured to prevent connection of the rechargeable unit 12 to the bath lift 18 when the voltage of the rechargeable unit 12 falls below a lower predetermined limit, which in this instance is 17 V. The first protection unit connects to a connector 16 which can connect with a recharging unit 18 or a bath lift 18 as required.

The first protection unit 14 also connects to a second protection unit 20 which monitors the voltage from the rechargeable unit 12 and particularly detects whether the voltage of the rechargeable unit has fallen below an upper predetermined voltage, which in this instance is 23.75 V. The second protection unit 20 connects to a control unit 22 which has up and down controls. The control unit 22 connects to the connector 16.

Figure 2:
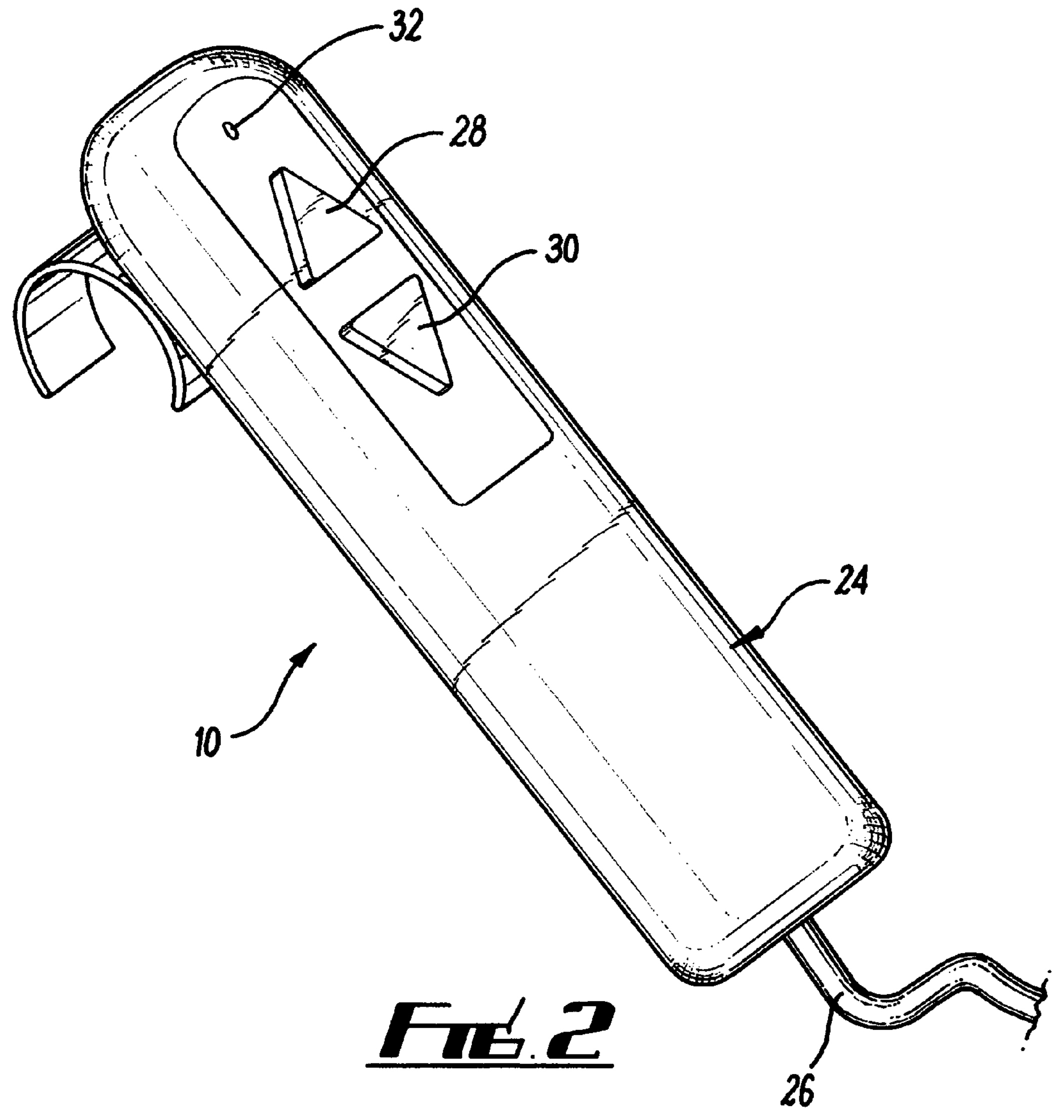
FIG. 2 is a perspective view of the controller of FIG. 1.

FIG. 2 shows the controller 10 in the form of a waterproof body 24 which locates the units 12, 14 and 20. An electric lead 26 extends from the body 14 to the connector 16 (not shown in FIG. 2). Up and down control buttons 28, 30 are provided which are manually operable by a person on the bath lift 18. A warning light 32 is provided to indicate when the voltage of the rechargeable unit 12 is low and thus recharging should take place.

In use, the rechargeable unit 12 can be recharged by connecting the connection 16 to the recharging unit 18 which can be mains powered and located away from a bathroom. The recharging unit 18 may indicate when the rechargeable unit 12 is fully charged. Once this is the case the controller 10 can be used to control a bath lift 18, with the connector 16 connected to the bath lift 18.

The body 24 can be held by a person on the bath lift 18. If the bath lift 18 is in a raised position a person can sit on the band thereof. The voltage of the recharging unit 12 is measured by the first protection unit 14, and presuming the voltage is above 17 V the bath lift 18 can be operated. A constant electrical current is fed from the unit 14 through the connector 16 which is used to provide a small charge to the bath lift to retain the band taut.

The first protection unit 14 also detects for any possible undercurrent and in the event that this is significant, will prevent operation of the bath lift 18. The first protection unit 14 also detects over voltage from the recharging unit 18, and if detected will disconnect the rechargeable unit 12 therefrom to protect same.

The second protection unit 20 also monitors the voltage of the rechargeable unit 12. If this is detected as being greater than 23.75 V, and the down button 30 is pushed, this will cause the bath lift 18 to operate to feed out the band causing a person to be lowered into a bath. If however it is detected that the voltage has dropped below 23.75 V, the control unit 22 will not permit this downward movement, and the warning light 32 will be lit.

Once a person wishes to get out of the bath, the up button 28 is depressed causing the band to be wound into the bath lift, thereby lifting the person out of the bath. Once the band is at its highest position, a small amount of current will continue to be supplied to the bath lift such that tension is applied thereby to the band to retain it taut, until the bath lift is switched on.

There is thus provided a controller for a bath lift which provides a number of advantages. The controller provides the power for the bath lift but can be recharged away from the bath lift, thereby preventing the requirement for mains power in a bathroom. The first protection unit prevents the rechargeable unit from being discharged so much such that damage will occur and full recharge will not be possible. The first protection unit also provides protection against overcharging and overcurrent discharges. The second protection unit prevents a person becoming stuck in a bath, but allows the lift to operate such that a person in a bath can be lifted thereoutof.

Whilst the invention has been described in terms of a controller for a bath lift and also a bath lift assembly incorporating such a controller, it is be realised that such a controller could be used in a wide range of other operations to provide security against total discharge of rechargeable units, and also to prevent an operation taking place when a rechargeable unit is at a low level of charge.

Various other modifications may be made without departing from the scope of the invention. For instance a different arrangement or type of electric cells could be used. Different controls could be provided.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for a bath lift which controller can be hand held by a user of the bath lift, the controller including one or more rechargeable electric cells, connection means permitting the controller to be selectively connected to a bath lift to control same, or to a recharging unit to recharge the electric cell or cells, the controller also including operating controls selectively operable to cause the bath lift to raise or lower a person, the bath lift being powered by the electric cell or cells in the controller, the controller also including first and second control protection means configured to monitor the voltage of the electric cells such that when it is detected by the second control protection means that the voltage has fallen below an upper predetermined level the second control protection means prevents the bath lift from being lowered but allows the bath lift to operate such that a person in a bath can be lifted out of the bath, and when it is detected by the first control protection means that the voltage has fallen below a lower predetermined level the first control protection means prevents the bath lift from being used at all, whereby to prevent the electric cells from being discharged so much that they cannot thereafter be fully recharged.

2. A controller according to claim 1, in which the connection means includes a lead which extends to a connector which can be selectively connected to the bath lift or to a recharging unit for the electric cell or cells.

3. A controller according to claim 1, in which the lower predetermined level is between 19 and 15 V.

4. A controller according to claim 3, in which the lower predetermined level is between 18 and 16 V.

5. A controller according to claim 1, in which the upper predetermined level is between 24 and 23 V.

6. A controller according to claim 5, in which the upper predetermined level is between 24 and 23.5 V.

7. A controller according to claim 1, in which the controller is configured to provide two power sources to a bath lift, a first substantially constant power source, and a second selectively controllable source.

8. A controller according to claim 7, in which the first power source operates the bath lift to retain a band of the bath lift taut when in the raised position.

9. A controller according to claim 7, in which the second source selectively raises or lowers the bath lift in response to the operating controls.

10. A controller according to claim 1, in which the electric cell or cells is in the form of lithium batteries.

11. A bath lift assembly, the assembly including a bath lift and a controller according to claim 1.

12. A bath lift assembly according to claim 11, in which the bath lift is of the type with a flexible band which is selectively movable between a raised position with the band extending taut across the top of the bath, and a lowered position with the band loose and extending down to substantially touch the bottom of a bath when a person is sitting on the band.

13. A bath lift assembly according to claim 12, in which the bath lift is arranged such that when the bath lift is on and the band is in the raised position, tension is applied to the band by the bath lift to retain the band taut.

14. A controller for an electrically operated device, the controller including one or more rechargeable electric cells, connection means permitting the controller to be selectively connected to the device or to a recharging unit to recharge the electric cell or cells, the controller also including operating controls selectively operable to cause at least two different operations of the device, the controller also including first and second control protection means configured to monitor the voltage of the electric cell or cells such that when it is detected by the second control protection means that the voltage has fallen below an upper predetermined level the second control protection means prevents at least one operation of the device, and when it is detected by the first control protection means that the voltage has fallen below a lower predetermined level, the first control protection means prevents any usage of the device.

* * * * *